(12) United States Patent
Tsuji et al.

(10) Patent No.: US 8,819,456 B2
(45) Date of Patent: Aug. 26, 2014

(54) CONTENT RECEIVING TERMINAL, CONTENT EXPORTING AND REPRODUCING METHOD, AND RECORDING MEDIUM

(71) Applicant: Panasonic Corporation, Osaka (JP)

(72) Inventors: Hisashi Tsuji, Osaka (JP); Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/650,458

(22) Filed: Oct. 12, 2012

(65) Prior Publication Data

US 2013/0039492 A1   Feb. 14, 2013

Related U.S. Application Data

(63) Continuation of application No. PCT/JP2010/006818, filed on Nov. 22, 2010.

(30) Foreign Application Priority Data

Apr. 19, 2010   (JP) ................................. 2010-096254

(51) Int. Cl.
*H04N 7/167*   (2011.01)
*H04N 5/913*   (2006.01)
*H04N 21/4627*   (2011.01)
*H04L 9/08*   (2006.01)
*H04N 21/4367*   (2011.01)
*G11B 20/00*   (2006.01)
*H04N 21/8355*   (2011.01)

(52) U.S. Cl.
CPC ......... *H04N 7/1675* (2013.01); *H04N 21/4627* (2013.01); *G11B 20/00086* (2013.01); *H04N 21/8355* (2013.01); *G11B 20/00492* (2013.01); *H04L 9/083* (2013.01); *G11B 20/0021* (2013.01); *H04N 5/913* (2013.01); *H04L 9/0894* (2013.01); *H04N 21/4367* (2013.01); *H04L 9/0822* (2013.01); *H04L 2209/60* (2013.01); *G11B 20/00869* (2013.01); *G11B 20/00478* (2013.01); *H04N 2005/91364* (2013.01); *Y10S 705/905* (2013.01); *Y10S 705/908* (2013.01); *Y10S 705/911* (2013.01)
USPC ............. 713/193; 726/31; 380/201; 380/281; 705/57; 705/59; 705/905; 705/908; 705/911

(58) Field of Classification Search
USPC ............. 380/201–204, 277–286, 44–47, 210; 386/252, 259, 257; 713/193; 726/26, 726/31–33; 717/168, 174
See application file for complete search history.

(56) References Cited

U.S. PATENT DOCUMENTS

| | | | |
|---|---|---|---|
| 6,088,264 A * | 7/2000 | Hazen et al. | 365/185.11 |
| 7,124,304 B2 * | 10/2006 | Bel et al. | 713/193 |
| 8,458,742 B2 * | 6/2013 | Parker et al. | 725/31 |
| 2003/0009667 A1 | 1/2003 | Horiuchi et al. | |
| 2006/0143478 A1 * | 6/2006 | Morino et al. | 713/193 |
| 2007/0192633 A1 * | 8/2007 | Strom et al. | 713/193 |
| 2008/0181572 A2 | 7/2008 | Kikkawa et al. | |
| 2008/0247542 A1 | 10/2008 | Aylward et al. | |
| 2010/0129067 A1 | 5/2010 | Nagano | |
| 2010/0191976 A1 * | 7/2010 | Chu et al. | 713/176 |
| 2010/0275006 A1 | 10/2010 | Mio et al. | |

FOREIGN PATENT DOCUMENTS

JP   2007-142810   6/2007
JP   2008-271170   11/2008

OTHER PUBLICATIONS

International Search Report issued Mar. 1, 2011 in International Application No. PCT/JP2010/006818.

* cited by examiner

*Primary Examiner* — Tae Kim
*Assistant Examiner* — Louis Teng
(74) *Attorney, Agent, or Firm* — Wenderoth, Lind & Ponack, L.L.P.

(57) ABSTRACT

A content exporting and reproducing method includes i) a content export step of encrypting a decryption key for content, that is used for decrypting the encrypted content, by using an encryption key for decryption key, recording the encrypted decryption key for content in the portable recording medium, and exporting the encrypted content sequentially to the portable recording medium, and ii) a content reproduction step of reading out the encrypted decryption key for content from the portable recording medium, decrypting the encrypted decryption key for content by using a decryption key for decryption key, reading out the encrypted content that has been exported to the portable recording medium, and decrypting the encrypted content that is read out from the portable recording medium, by using the decrypted decryption key for content to reproduce the content, while the encrypted content is exported to the portable recording medium sequentially.

9 Claims, 14 Drawing Sheets

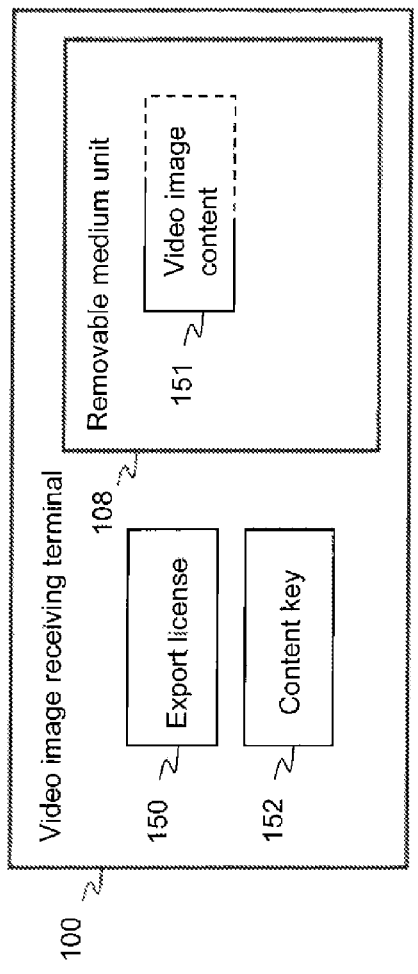
FIG. 4(A)  AT THE TIME OF PERFORMING OF DIRECT EXPORT PROCESSING
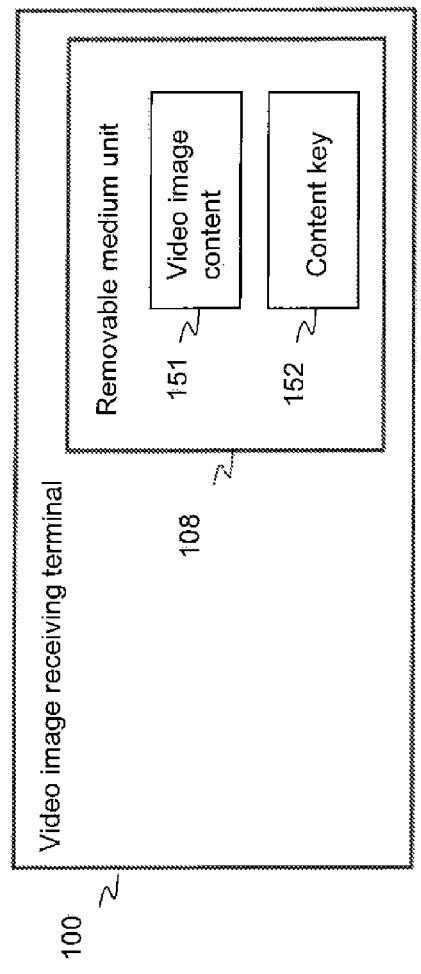
FIG. 4(B)  AFTER COMPLETION OF DIRECT EXPORT PROCESSING

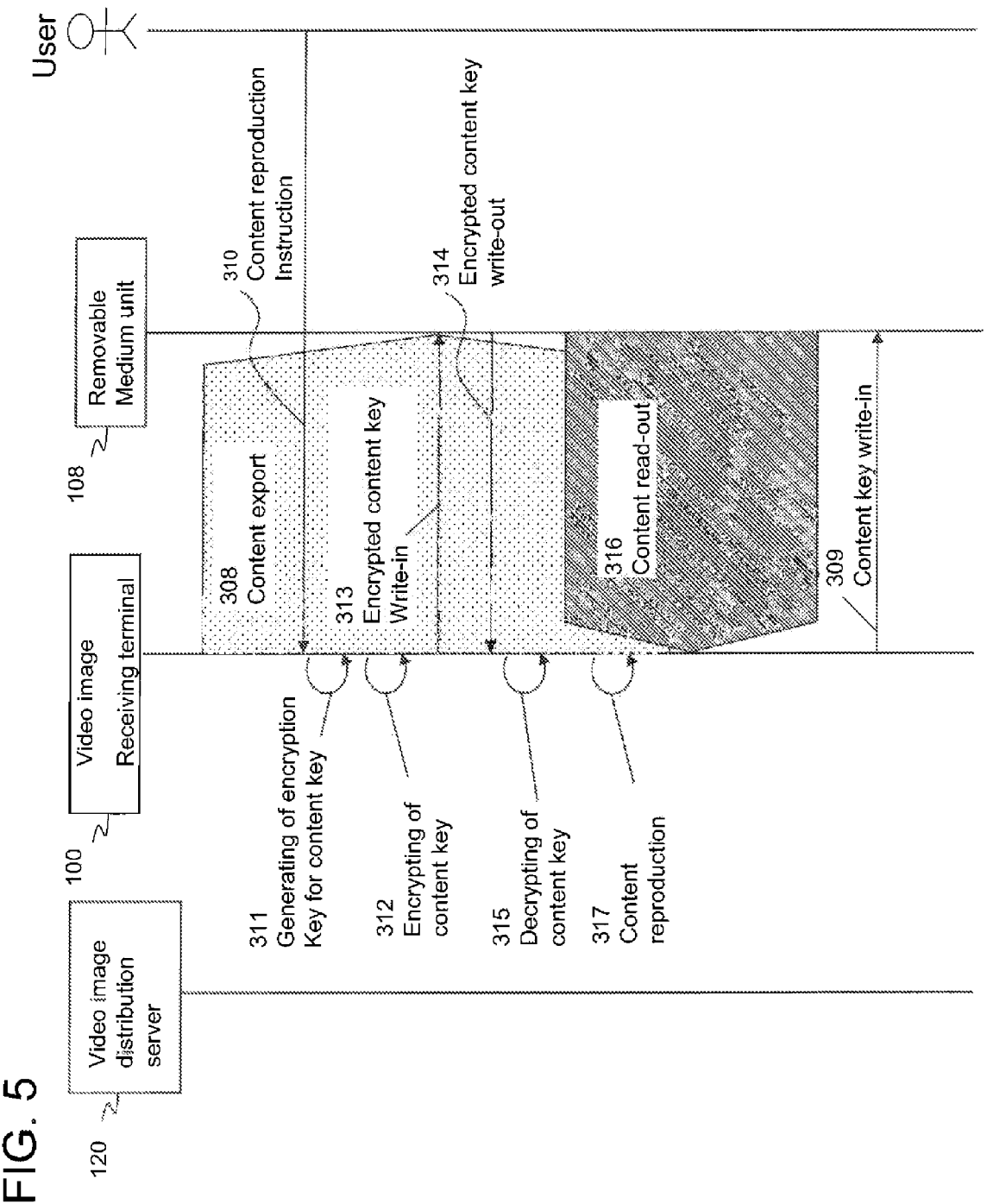

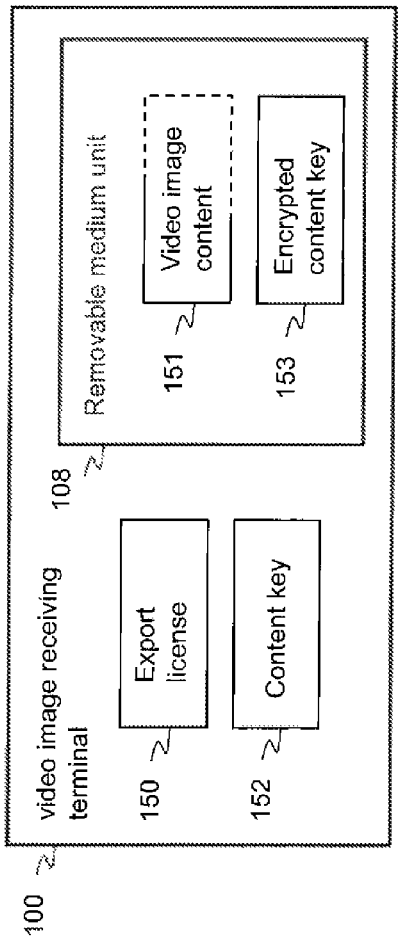
FIG. 7(A)    AT THE TIME OF PERFORMING OF PROGRESSIVE EXPORT PROCESSING
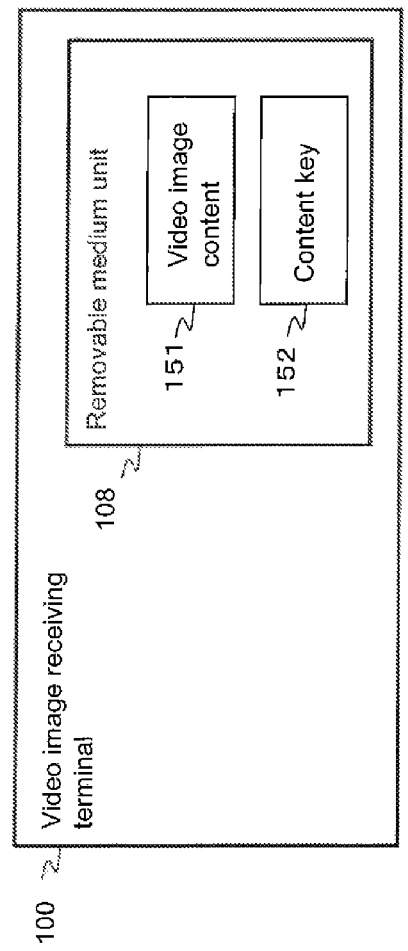
FIG. 7(B)    AFTER COMPLETION OF EXPORT PROCESSING

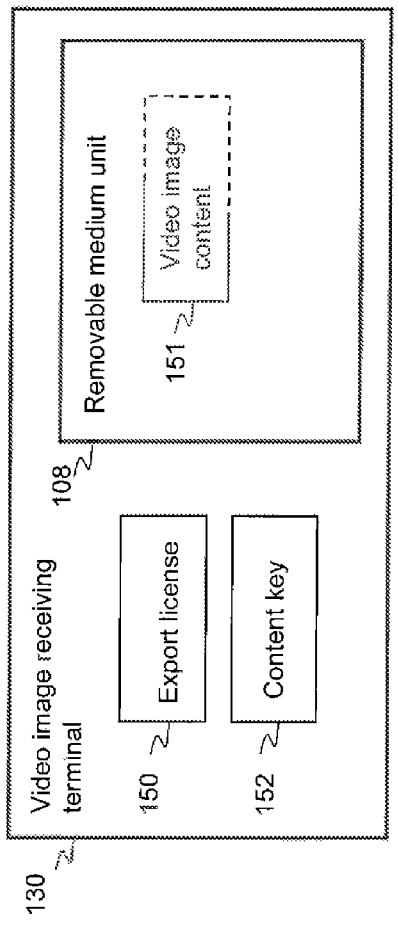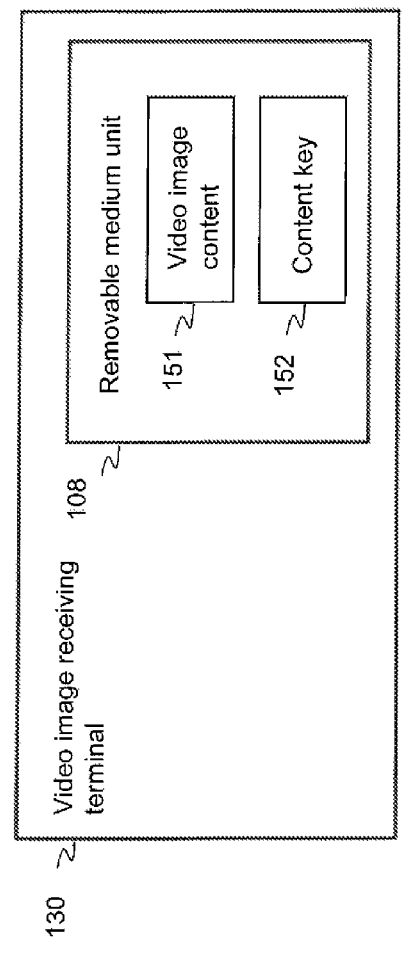

CONTENT RECEIVING TERMINAL, CONTENT EXPORTING AND REPRODUCING METHOD, AND RECORDING MEDIUM

CROSS-REFERENCE TO RELATED APPLICATIONS

This application is a continuation application of PCT International Patent Application No. PCT/JP2010/006818 filed Nov. 22, 2010, claiming the benefit of priority of Japanese Patent Application No. 2010-096254 filed Apr. 19, 2010, all of which are incorporated herein by reference in their entirety.

BACKGROUND OF THE INVENTION

1. Field of the Invention

The present invention relates to a content receiving terminal, a content exporting and reproducing method, and the like, by which a content is downloaded from a video image distribution server through a communication network to be exported to a removable medium. More particularly, the present invention relates to a content receiving terminal, a content exporting and reproducing method, and the like, which are used when the video image and sound contents are exported.

2. Related Art of the Invention

In recent years, a video image distribution service which uses a communication network (communication line) is becoming popular. In a video image distribution system which includes a video image distribution server for distributing a video image content and the like, a communication network including a global network such as an Internet and a home network, a video image receiving terminal apparatus connected to the home network (hereafter, expressed as "video image receiving terminal"), and the like, a user can use, by operating the video image receiving terminal as a terminal for viewing the video image, a VOD (Video On Demand) service, an IP (Internet Protocol) broadcasting, a video image download service, and the like, which are provided by the video image distribution server of a communication enterprise or a video image distribution enterprise.

FIG. 12(A) is a diagram for describing processing details of the video image content, in a conventional video image download service.

In a conventional video image download service, as shown in FIG. 12(A), a video image receiving terminal 200 downloads a video image content from a video image distribution server 210 and stores the content in the built-in HDD 201.

The video image receiving terminal 200 is permitted to reproduce the video image content by a viewing license which is acquired when the video image content is purchased. Then the video image receiving terminal 200 can decrypt and output the video image content stored in the HDD 201. The video image receiving terminal 200 outputs the decrypted video image content to a display 202 or the like which is connected to the video image receiving terminal 200, and the video image content can be viewed. When it is permitted to write the video image content into another medium, the video image receiving terminal 200, after decrypting the video image content stored in the HDD 201 and encrypting the decrypted content to be exported, can also write the encrypted video image content into a removable medium 203.

Further, nowadays, the user can use a direct export service in which a video image receiving terminal writes the video image content directly into a removable medium inserted in the video image receiving terminal.

FIG. 12(B) is a diagram for describing processing details of the video image content, in a conventional direct export service.

In the direct export service, as shown in FIG. 12(B), a video image receiving terminal 205 records the video image content, which is downloaded from a video image distribution server 210, in a removable medium 203 directly without storing the content in a built-in HDD 201 or the like shown in FIG. 12(A).

In the direct export service, as shown in FIG. 12(B), when the video image receiving terminal 205 acquires an export license, the video image receiving terminal 205 is permitted to write the video image content corresponding to the export license into the removable medium 203 directly. While the video image receiving terminal 205 downloads the video image content from the video image distribution server 210, the video image receiving terminal 205 decrypts the video image content through a buffer 206, encrypts the decrypted video image content to be exported and writes the encrypted video image content into the removable medium 203. The buffer 206 records temporarily a quantity of the data of the video image content required for decrypting and encrypting the content continuously during downloading of the video image content. The buffer 206 differs from the HDD 201 of FIG. 12(A), and the video image content is not finally held in the buffer 206.

When the user uses the video image download service, the user needs to reproduce the video image content, after completion of downloading of the video image content. Indeed, if the video image receiving terminal allows the user to perform the reproducing operation under the situation in which the downloading of the video image content has not been completed yet, the downloading and reproducing operation of the video image content will be performed in parallel. As a result, when the speed of the downloading operation is slow, the reproduction of the video image content may stop in the middle of download, and the user may be unnecessarily confused.

However, if the video image receiving terminal does not allow the user to perform the reproduction operation until the downloading of the video image content is completed, the convenience of the user decreases. In a Patent Document 1 (Japanese Patent Application Laid-Open No. 2008-271170), a progressive downloading method is suggested to prevent such decrease of convenience of the user and, in such a progressive downloading method, while the downloading of the video image content is continued, the reproduction of the video image content can be started in parallel.

In the progressive downloading method in the Japanese Patent Application Laid-Open No. 2008-271170, when the reproducing instruction from the user is inputted, the video image receiving terminal performs a calculation by comparing i) a present quantity of the downloaded data and a downloading speed with respect to the video image content which is in the middle of download and ii) a reproducing speed of the video image content. Then, the video image receiving terminal judges whether the download will have been already completed when the reproduction of the video image content is completed, and judges whether it is possible to reproduce the video image content.

FIGS. 13(A) and 13(B) are graphs showing a time-dependent relation between the downloading and the reproduction operation during the progressive downloading.

An axis of ordinate of the graph indicates a data quantity of the video image content which is downloaded and an axis of abscissa indicates a time. TD0 indicates timing for start of the downloading and TD1 indicates timing for completion of the downloading. Each of TP0 and TP2 indicates timing for start of the reproduction, and each of TP1 and TP3 indicates timing for end of the reproduction.

When the downloading is started at TD0, a quantity of the downloaded data 220 increases gradually and the downloading is completed at TD1. At this point of time, the content is stored in the HDD one hundred percent.

In the case of FIG. 13(A), the reproduction of the video image content has been started at TP0 before TD1 when the downloading is completed. The reproduction is also continued after TD1 when the downloading is completed. The reproduction is completed at TP1. A quantity of the data to be reproduced 221 increases with time and all data are used at TP1.

In this case, when the reproducing instruction from the user is inputted to the video image receiving terminal at TP0, the video image receiving terminal performs a calculation by comparing i) a present quantity of the downloaded data and a downloading speed with respect to the video image content which is in the middle of download and ii) a reproducing speed of the video image content. Then, the video image receiving terminal judges that the download will have been already completed at TD1 before TP1 at which the reproduction of the video image content will be completed. That is, since the quantity of the data to be reproduced 221 does not exceed the quantity of the downloaded data 220, the video image receiving terminal judges that it is possible to reproduce the video image content which is in the middle of download, and performs the progressive downloading.

On the other hand, FIG. 13(B) shows that the reproduction of the video image content is started at TP2 before TP0 shown in FIG. 13(A). In this case, when the reproducing instruction from the user is inputted to the video image receiving terminal at TP2, the video image receiving terminal performs a calculation by comparing i) a present quantity of the downloaded data and a downloading speed with respect to the video image content which is in the middle of download and ii) a reproducing speed of the video image content. Then, the video image receiving terminal judges that the reproduction of the video image content will have been already finished at TD3 before TD1 at which the download will be completed. That is, since the quantity of the data to be reproduced 221 exceeds the quantity of the downloaded data 220, the video image receiving terminal judges that it becomes impossible to continue the reproduction of the video image content.

Therefore, when the reproducing instruction from the user is inputted to the video image receiving terminal at TP2 as shown in FIG. 13(B), a message, which indicates that the reproduction of the video image content that is in the middle of download can not be performed to the end, is displayed on a display device (not shown) of the video image receiving terminal, and the video image receiving terminal does not perform reproduction of the video image content.

As described above, when the reproducing instruction from the user is inputted, the video image receiving terminal judges whether it is possible to reproduce the video image content, which is in the middle of download, to realize progressive downloading.

SUMMARY OF THE INVENTION

Problems to be Solved by the Invention

However, in the direct export service, when the above mentioned conventional progressive downloading technique is merely applied to perform a progressive export in which the reproduction of the video image content can be started in parallel while the downloading of the video image content is continued, there is a problem that if progressive export processing is abnormally suspended, an export license is consumed.

In order to explain the above mentioned problem, first of all, general preconditions are described which is assumed for carrying out the progressive export in which the video image content is read out from the removable medium and is reproduced in parallel with the export processing.

i) In the case of the progressive export, a key for decrypting the video image content (the key is referred to as "content key" herein) must be written in a removable medium in order to reproduce the video image content recorded in the removable medium.

ii) As described above with FIG. 12(B), the video image receiving terminal acquires an export license in order to export the video image content to the removable medium. The video image receiving terminal consumes the export license and must delete the export license from the video image receiving terminal when the video image receiving terminal is in a condition to be able to reproduce a part of the video image content written into the removable medium.

Under the above mentioned preconditions i) and ii), the locations of the export license, the content key, and the video image content before starting of the export processing and at the time of performing of the progressive export processing are shown in FIGS. 14(A) and 14(B).

FIGS. 14(A) and 14(B) show the locations of the export license, the content key, and the video image content before starting of the export processing and at the time of performing of the progressive export processing, concerning the progressive export processing performed by the video image receiving terminal 205 shown in FIG. 12(B).

As shown in FIG. 14(A), the video image receiving terminal 205 holds the export license 211 and the content key 212 before the export processing is started. The export license 211 is used in order that the video image receiving terminal 205 can export the content. The content key 212 is used in order that the video image receiving terminal 205 can encrypt the decrypted video image content which is to be exported for the removable medium 203, and can also decrypt the video image content which has been encrypted and recorded in the removable medium 203. The export license 211 is acquired mainly from the video image distribution server 210, but can be acquired from equipment other than the video image distribution server 210. The content key 212 can be acquired from the video image distribution server 210, and also can be generated in the video image receiving terminal 205.

After starting of the progressive export processing, as shown in FIG. 14(B), while the video image content which is in the middle of download is recorded in the removable medium 203 sequentially, the content key 212 is also recorded in the removable medium 203 in accordance with the precondition i) in order to reproduce the video image content 213 recorded in the removable medium 203. Further, since content key 212 is recorded in the removable medium 203 and then the video image content 213 which has been already recorded in the removable medium 203 can be reproduced, the export license 211 which is held in the video image receiving terminal 205 is deleted in accordance with the precondition ii).

Therefore, if the progressive export processing is suspended due to turning-off of a power supply or starting of another application for the video image receiving terminal 205 during execution of the progressive export processing, as shown in FIG. 14(B), the video image content 213 which is in the middle of export processing and the content key 212 have been recorded in the removable medium 203, and the export license 211 has been deleted from the video image receiving terminal 205. In this case, another export license is needed in order to continue the export processing again under such a situation. That is, at least two export licenses are consumed with respect to one video image content. This matter decreases benefit of a user remarkably.

In view of the above-mentioned conventional problems, an object of the present invention is to provide a content receiving terminal, a content exporting and reproducing method, and the like, which can continue export processing of a video image content without consumption of the export license even if the progressive export processing is abnormally suspended.

Means for Solving the Problems

The 1$^{st}$ aspect of the present invention is a content receiving terminal comprising:

a content receiving unit which receives a content from a content server through a communication network, based on an acquired export license;

a content encrypting unit which encrypts the content that is received by the content receiving unit, by using an encryption key for content;

a content export unit which exports the encrypted content directly and sequentially to a portable recording medium;

a decryption key encrypting unit which encrypts a decryption key for content, which is used for decrypting the encrypted content, by using an encryption key for decryption key, the encryption key for decryption key being generated uniquely;

an encrypted decryption key write-out unit which records the encrypted decryption key for content in the portable recording medium;

a content read-out unit which reads out the encrypted content that has been exported to the portable recording medium;

a decryption key read-out unit which reads out the encrypted decryption key for content from the portable recording medium;

a decryption key decrypting unit which decrypts the encrypted decryption key for content by using a decryption key for decryption key, the encrypted decryption key for content being read out by the decryption key read-out unit;

a decryption key for decryption key holding unit which holds the decryption key for decryption key; and a content reproducing unit which decrypts the encrypted content that is read out from the portable recording medium, by using the decryption key for content to reproduce the content, the decryption key for content being decrypted by the decryption key decrypting unit, wherein the decryption key for decryption key is not recorded in the portable recording medium, and the content read-out unit reads out the encrypted content sequentially, while the encrypted content is exported sequentially to the portable recording medium.

The 2$^{nd}$ aspect of the present invention is the content receiving terminal according to the 1$^{st}$ aspect of the present invention, comprising a decryption key write-out and destroying unit which records the decryption key for content, that is not encrypted, in the portable recording medium and destroys the export license, when the exporting of the encrypted content to the portable recording medium is completed.

The 3$^{rd}$ aspect of the present invention is the content receiving terminal according to the 1$^{st}$ aspect of the present invention, comprising a decryption key for decryption key encrypting unit which encrypts the decryption key for decryption key by using another encryption key generated uniquely, wherein the encryption key for decryption key is generated uniquely by the decryption key encrypting unit, and when the decryption key for decryption key is encrypted, the encrypted decryption key write-out unit records the encrypted decryption key for decryption key in the portable recording medium.

The 4$^{th}$ aspect of the present invention is a content exporting and reproducing method in a content receiving terminal configured to encrypt a content that is received from a content server through a communication network, based on an acquired export license, by using an encryption key for content, and export the encrypted content directly to a portable recording medium, the content exporting and reproducing method comprising:

a content export step of encrypting a decryption key for content, that is used for decrypting the encrypted content, by using an encryption key for decryption key, recording the encrypted decryption key for content in the portable recording medium, and exporting the encrypted content sequentially to the portable recording medium; and a content reproduction step of reading out the encrypted decryption key for content from the portable recording medium, decrypting the encrypted decryption key for content by using a decryption key for decryption key, reading out the encrypted content that has been exported to the portable recording medium, and decrypting the encrypted content that is read out from the portable recording medium, by using the decrypted decryption key for content to reproduce the content, while the encrypted content is exported to the portable recording medium sequentially.

The 5$^{th}$ aspect of the present invention is the content exporting and reproducing method according to the 4$^{th}$ aspect of the present invention, comprising a decryption key recording step of recording the decryption key for content, which is not encrypted, in the portable recording medium, and destroying the export license, when the exporting of the encrypted content to the portable recording medium is completed.

The 6$^{th}$ aspect of the present invention is a non-transitory computer-readable medium having a program stored thereon, wherein the program causes a computer to execute the content export step and the content reproduction step of the content exporting and reproducing method according to the 4$^{th}$ aspect of the present invention.

The 7$^{th}$ aspect of the present invention is the content receiving terminal according to the 2$^{nd}$ aspect of the present invention, comprising a decryption key for decryption key encrypting unit which encrypts the decryption key for decryption key by using another encryption key generated uniquely, wherein the encryption key for decryption key is generated uniquely by the decryption key encrypting unit, and when the decryption key for decryption key is encrypted, the encrypted decryption key write-out unit records the encrypted decryption key for decryption key in the portable recording medium.

Advantageous Effects of Invention

The present invention can provide a content receiving terminal, a content exporting and reproducing method, and the like, which can continue export processing of a video image content without consumption of the export license even if the progressive export processing is abnormally suspended.

BRIEF DESCRIPTION OF THE DRAWINGS

FIG. 4(A) is a diagram showing the locations of the export license, the content key, and the video image content at the time of performing of the direct export processing, in the case where the direct export processing is performed by the video image receiving terminal according to a first embodiment of the present invention;

FIG. 4(B) is a diagram showing the locations of the export license, the content key, and the video image content after completion of the export processing, in the case where the direct export processing is performed by the video image receiving terminal according to a first embodiment of the present invention;

FIG. 5 is a diagram showing an operation and a communication sequence, which are performed with respect to the video image receiving terminal and the video image distribution server at the time of the progressive export of the video image content, according to a first embodiment of the present invention;

FIG. 7(A) is a diagram showing the locations of the export license, the content key, and the video image content at the time of performing of the progressive export processing, in the case where the progressive export processing is performed by the video image receiving terminal according to a first embodiment of the present invention;

FIG. 7(B) is a diagram showing the locations of the export license, the content key, and the video image content after completion of the export processing, in the case where the progressive export processing is performed by the video image receiving terminal according to a first embodiment of the present invention;

FIG. 11(A) is a diagram showing the locations of the export license, the content key, and the video image content at the time of performing of the progressive export processing, in the case where the progressive export processing is performed by the video image receiving terminal according to a second embodiment of the invention which is related to the present invention;

FIG. 11(B) is a diagram showing the locations of the export license, the content key, and the video image content after completion of the export processing, in the case where the progressive export processing is performed by the video image receiving terminal according to a second embodiment of the invention which is related to the present invention;

PREFERRED EMBODIMENTS OF THE INVENTION

Embodiments to which the present invention and the invention related to the present invention are applied are described in detail below with reference to the drawings.

(First Embodiment)

Figure 1:
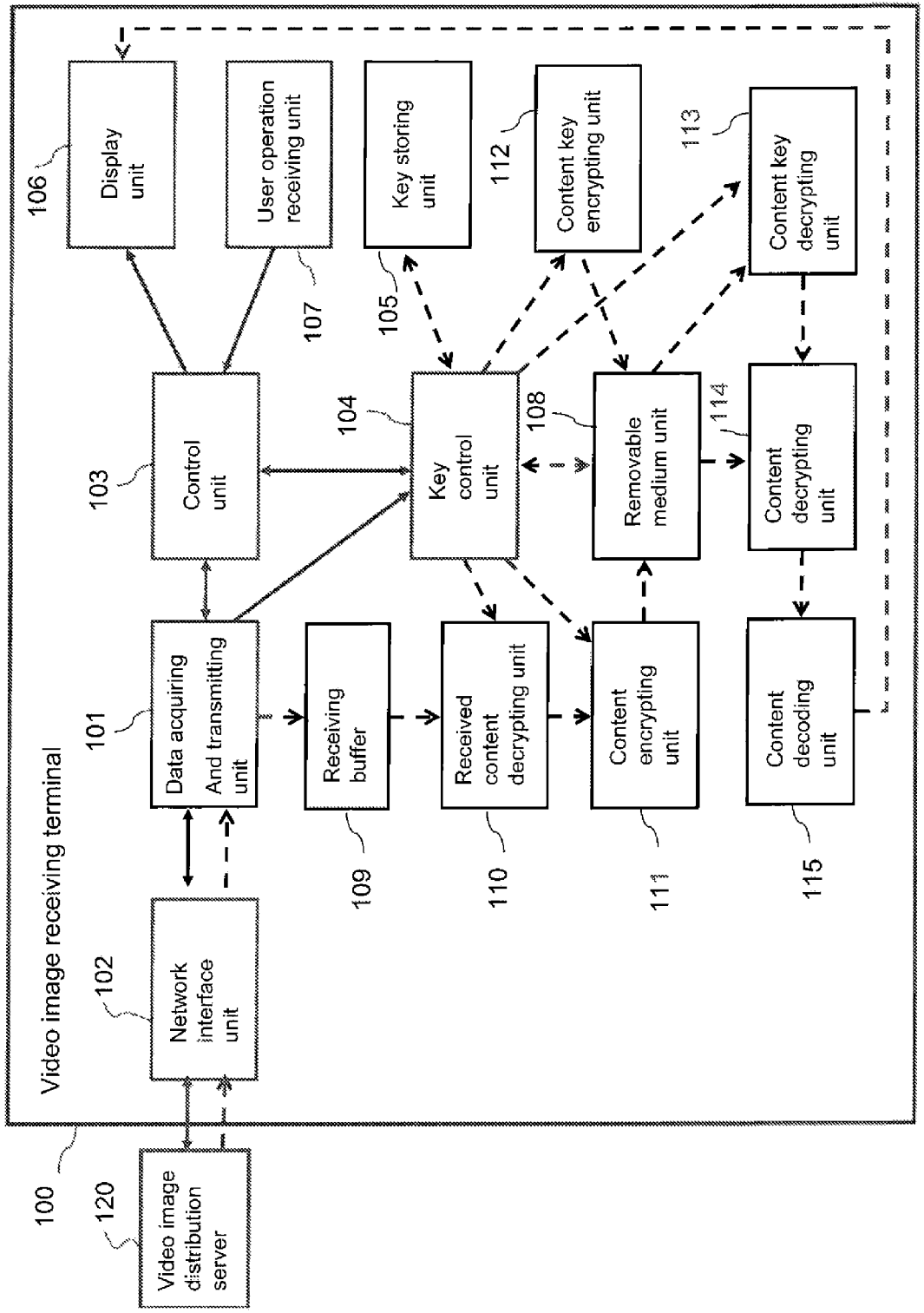
FIG. 1 is a block diagram showing a configuration of a video image receiving terminal according to a first embodiment of the present invention.

FIG. 1 is a block diagram showing a configuration of a video image receiving terminal according to a first embodiment of the present invention.

In FIG. 1, the video image receiving terminal 100 according to the first embodiment has a data acquiring and transmitting unit 101, a network interface unit 102, a control unit 103, a key control unit 104, a key storing unit 105, a display unit 106, an user operation receiving unit 107, a receiving buffer 109, a received content decrypting unit 110, a content encrypting unit 111, a content key encrypting unit 112, a content key decrypting unit 113, a content decrypting unit 114, and a content decoding unit 115. When a user wants to carry out a progressive export, the video image receiving terminal 100 has a function of performing the progressive export without consumption of the export license.

Further, the video image receiving terminal 100 allows a removable medium unit 108 to be set. The removable medium unit 108 is a medium for recording the video image content. As this medium, a CD (Compact Disc), a DVD (Digital Versatile Disc), a BD (Blu-ray Disc (registered trademark)), an SD memory card (Secure Digital Memory Card), a Memory Stick or the like can be considered. But the medium is not limited to any of these. Generally, this removable medium unit 108 is of a portable type.

By the way, the video image receiving terminal 100 is a video image receiving terminal having a function of receiving a video image content through a communication network in the video image download service and the direct export service provided by a communication enterprise or a video image distribution enterprise, and a function of performing the export of the video image content to the removable medium. As such a video image receiving terminal 100, a digital television, a set top box, a personal computer or the like can be considered. But the video image receiving terminal 100 is not limited to any of these.

In FIG. 1, an arrow shown with a dashed line shows a flow of data of a video image content, a license, an encryption key, a decryption key, and the like. Further, in FIG. 1, an arrow shown with a solid line shows a flow of other information, such as control information.

The network interface unit 102 is connected to a video image distribution server 120 provided by the communication enterprise or the video image distribution enterprise, through an external communication network.

The data acquiring and transmitting unit 101 receives a video image content and license information, which are transmitted from the video image distribution server 120, through the network interface unit 102. And the data acquiring and transmitting unit 101 transmits the data indicated by the control unit 103 to the video image distribution server 120 through the network interface unit 102.

The control unit 103 performs control of each operation in the video image receiving terminal 100.

The key control unit 104 performs management and control of key information in the video image receiving terminal 100.

The key storing unit 105 stores an encryption key, a decryption key, and the like which are received from the video image distribution server 120, and stores an encryption key, a decryption key, and the like which are generated by the video image receiving terminal 100.

The display unit 106 displays the data and the decoded video image content which have been requested to be displayed by the control unit 103.

The user operation receiving unit 107 accepts a request to export a video image content or a request to reproduce a video image content from the outside, for example, with an operation of a remote controller by the user. And the user operation receiving unit 107 transmits, to the control unit 103, the accepted request to export the video image content or the accepted request to reproduce the video image content.

The receiving buffer 109 is a buffer which records a required quantity of the data temporarily in order to make the received content decrypting unit 110 and the content encrypting unit 111 process the data of the video image content under download. A RAM or the like is used as the receiving buffer 109.

The received content decrypting unit 110 receives the video image content, which is being downloaded from the video image distribution server 120, from the data acquiring and transmitting unit 101 through the receiving buffer 109, and receives a decryption key for decrypting the received video image content from the key control unit 104. And the received content decrypting unit 110 decrypts the received video image content.

The content encryption unit 111 encrypts data of the video image content decrypted by the content decrypting unit 110 in order to export the data of the video image content to the removable medium unit 108. The content encryption unit 111 receives a key for encrypting content from the key control unit 104.

Incidentally, the key for encrypting content, which is used by the content encrypting unit 111 to encrypt the video image content that is to be exported, corresponds to one example of an encryption key for content according to the present invention.

The content key encrypting unit 112 receives a key for decrypting content, which is used to decrypt the encrypted video image content stored in the removable medium unit 108, from the key control unit 104, and encrypts the received key for decrypting content by using an encryption key generated uniquely by the video image receiving terminal 100. And the content key encrypting unit 112 writes the encrypted key for decrypting content into the removable medium unit 108.

By the way, in the description of the present specification, the above described key for encrypting content, which is used by the content encrypting unit 111, is completely the same as the above described key for decrypting content, which is used to decrypt the encrypted video image content stored in the removable medium unit 108. Therefore, each of the both keys will be simply referred to as "content key" hereafter.

Incidentally, the key for decrypting content, which is used to decrypt the encrypted video image content stored in the removable medium unit 108, in other words, the content key, corresponds to one example of a decryption key for content according to the present invention. Further, the encryption key, which is generated uniquely by the video image receiving terminal 100 and is used by the content key encrypting unit 112 to encrypt this content key, corresponds to one example of an encryption key for decryption key according to the present invention.

The content key decrypting unit 113 receives the encrypted content key from the removable medium unit 108, and receives a decryption key for decrypting the encrypted content key from the key control unit 104. And the content key decrypting unit 113 decrypts the encrypted content key.

Incidentally, the decryption key for decrypting the encrypted content key, which is received from the key control unit 104 by the content key decrypting unit 113 to decrypt the encrypted content key, corresponds to one example of a decryption key for decryption key according to the present invention.

The content decrypting unit 114 receives the video image content from the removable medium unit 108, and receives the content key from the content key decrypting unit 113. And the content decrypting unit 110 decrypts the video image content.

The content decoding unit 115 receives the decrypted video image content from the content decrypting unit 114, and decodes the decrypted video image content. The decoded data is displayed by the display unit 106.

By the way, the video image receiving unit 100 corresponds to one example of a content receiving terminal according to the present invention. The video image distribution server 120 corresponds to one example of a content server according to the present invention. The video image content which is downloaded from the video image distribution server 120 corresponds to one example of a content according to the present invention. The removable medium unit 108 corresponds to one example of a portable recording medium according to the present invention. The data acquiring and transmitting unit 101 corresponds to one example of a content receiving unit according to the present invention. The configuration which includes the receiving buffer 109, the receiving content decrypting unit 110, and the content encrypting unit 111 corresponds to one example of a content export unit according to the present invention. The content key encrypting unit 112 corresponds to one example of a configuration which includes a decryption key encrypting unit and an encrypted decryption key write-out unit according to the present invention. The content key decrypting unit 113 corresponds to one example of a configuration which includes a decryption key read-out unit and a decryption key decrypting unit according to the present invention. The content decrypting unit 114 corresponds to one example of a content read-out unit according to the present invention. The configuration which includes the content decrypting unit 114 and the content decoding unit 115 corresponds to one example of a content reproducing unit according to the present invention.

A procedure which is performed at the time of the direct export of the video image content in the video image receiving terminal 100, and a procedure which is performed with respect to the progressive export during the content export in the video image receiving terminal 100 will be described below.

First, the procedure which is to be performed at the time of the direct export of the video image content in the video image receiving terminal 100 will be described with reference to FIGS. 1 to 3.

Figure 2:
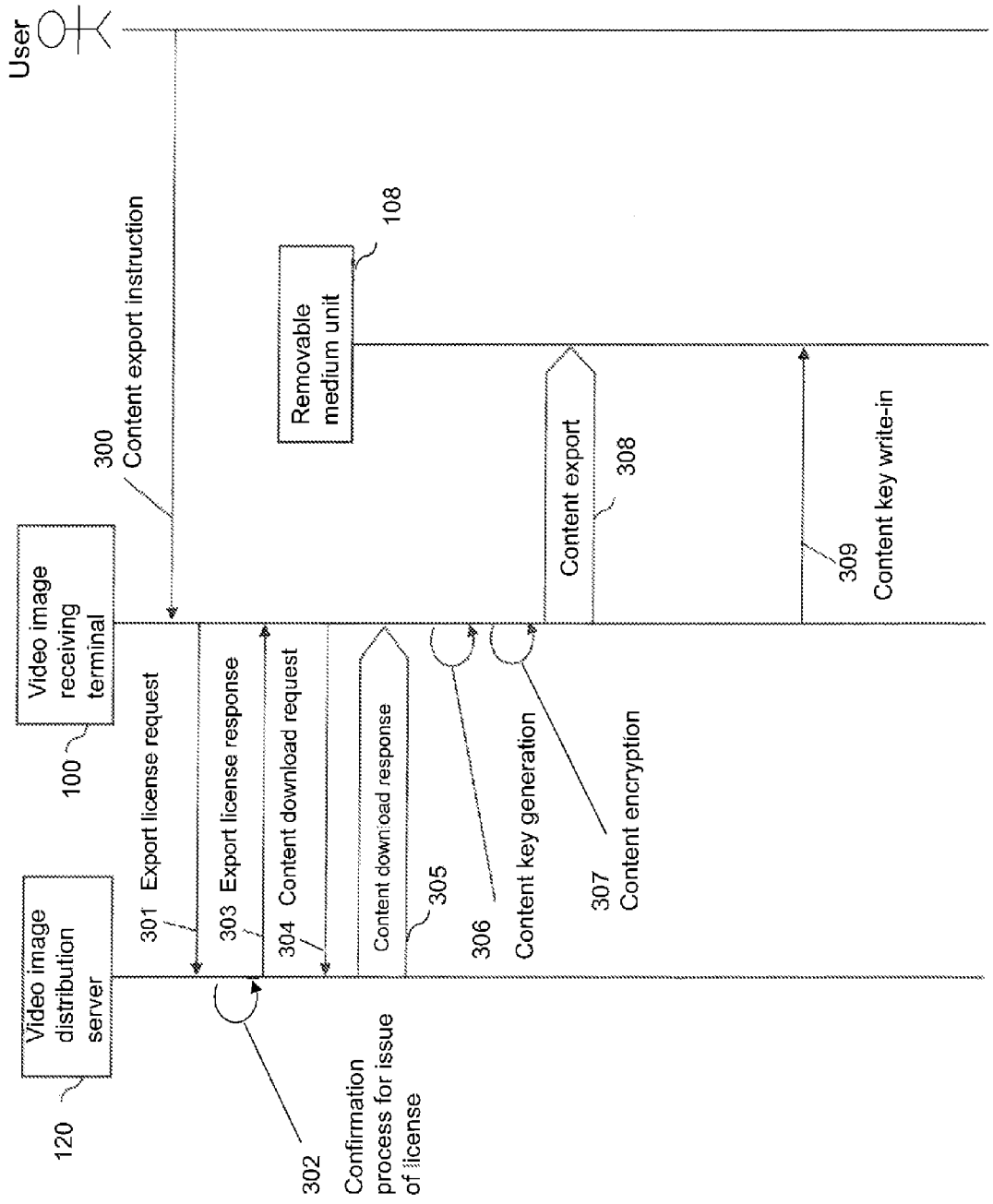
FIG. 2 is a diagram showing an operation and a communication sequence, which are performed with respect to a video image receiving terminal and a video image distribution server at the time of the direct export of the video image content, according to a first embodiment of the present invention.
Figure 3:
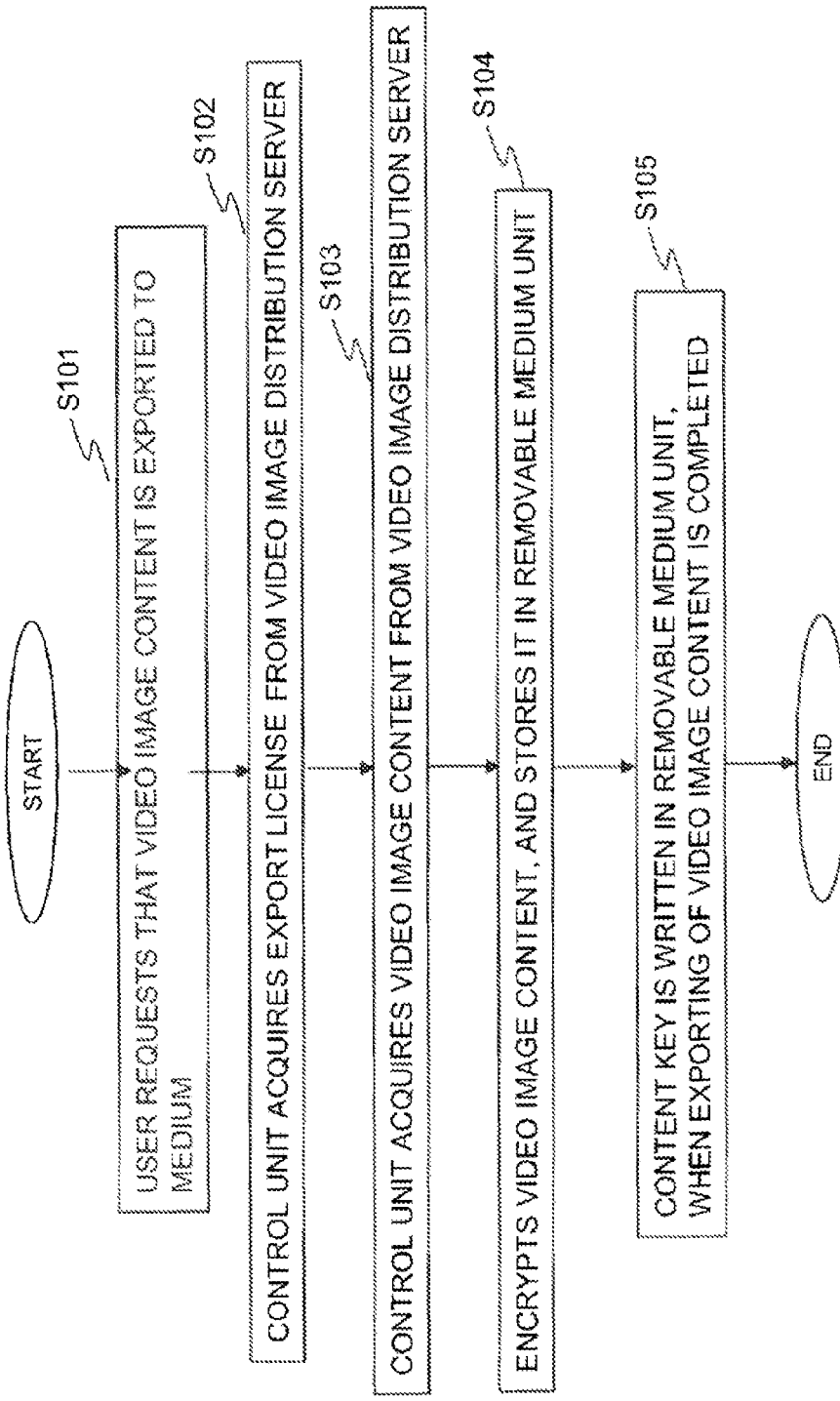
FIG. 3 is a flowchart showing a procedure which is performed with respect to the export at the time of the direct export of the video image content in the video image receiving terminal according to a first embodiment of the present invention.

FIG. 2 shows an operation and a communication sequence, which are performed with respect to the video image receiving terminal 100 and the video image distribution server 120 at the time of the direct export of the video image content. FIG. 3 is a flowchart showing a procedure which is performed with respect to the export at the time of the direct export of the video image content in the video image receiving terminal 100.

A user operates the display on a screen displaying detail information for the video image content which is provided from the video image distribution server 120, and the export of the video image content is performed. Then, the user operation receiving unit 107 receives a content export request (a content export instruction 300) from the user (see step S101).

The user operation receiving unit 107, which has accepted the content export request from the user, transmits the content export request to the control unit 103. The control unit 103 makes the data acquiring and transmitting unit 101 transmit an export license request 301 to the video image distribution server 120. The video image distribution server 120, which has received the export license request 301, confirms whether the export license is allowed to be issued to the video image receiving terminal 100 (confirmation process for issue of license 302), and if the result of the confirmation is "OK," the video image distribution server 120 returns an export license response to the video image receiving terminal 100. The key control unit 104 of the video image receiving terminal 100, which has acquired the export license, stores the export license in the key storing unit 105, and sets an encryption key included in the export license in the receiving content decrypting unit 110 (see step S102).

Next, the control unit 103 makes the data acquiring and transmitting unit 101 transmit the content download request 304. The video image distribution server 120, which has received the content download request 304, returns a content download response 305 to the video image receiving unit 100 (see step S103). That is to say, the download of the video image content is started from the video image distribution server 120 to the video image receiving unit 100.

The key control 104, which is in the video image receiving unit 100 that has started receiving the video image content from the video image distribution server 120, generates the above mentioned content key in order to export the video image content to the removable medium unit 108. The key control unit 104 stores the content key in the key storing unit 105, and sets the content key in the content encrypting unit 111 simultaneously (content key generation 306). The video image content, which has been downloaded by the video image receiving unit 100, is decrypted by the received content decrypting unit 110, the decrypted video image content is encrypted for the removable medium by using the content key in the content encrypting unit 111 (content encryption), and the encrypted video image content is stored in the removable medium unit 108 (content export 308) (see step S104). Incidentally, it has been described that the video image receiving unit 100 generates the content key in the above mentioned method for acquiring of the content key. However, for instance, another constitution in which the content key can be acquired from the video image distribution server 120 can be allowed. That is to say, the present invention is not limited to these constitutions.

When the video image content has been completely exported to the removable medium unit 108, the key control unit 104 writes the content key in the removable medium unit 108 (content key write-in 309), and deletes the export license which is stored in the key storing unit 105 (see step S105). Accordingly, it is possible to reproduce the video image content in the removable medium unit 108 by using another reproduction terminal.

FIGS. 4(A) and 4(B) show the locations of the export license, the content key, and the video image content at the time of performing of the direct export processing and after completion of the export processing, in the case where the direct export processing is performed by the video image receiving terminal 100 according to the first embodiment.

As shown in FIG. 4(A), at the time of direct export processing, the video image content 151 which is in the middle of download is recorded in the removable medium unit 108 sequentially. In this case, the content key 152 is not recorded in the removable medium unit 108. Therefore, even if the direct export processing of the video image content is abnormally suspended, the video image content 151 which has been recorded in the removable medium unit 108 can not be reproduced by another reproduction terminal other than the video image receiving terminal 100, because the content key 152 is not recorded in the removable medium unit 108 as described above. Accordingly, during the direct export processing, it is unnecessary to delete the export license 150 acquired by the video image receiving terminal 100, and the export license 150 is stored in the key storing unit 105.

Then, after the direct export processing has been completed, as shown in FIG. 4(B), the content key 152 is recorded in the removable medium unit 108 in order that other reproduction terminals can also reproduce the video image content 151 which has been recorded in the removable medium unit 108, and the export license 150 which has been stored in the key storing unit 105 of the video image receiving terminal 100 is deleted.

Incidentally, in the above-described example, a case of the direct export service, in which the video image receiving terminal 100 downloads the video image content from the video image distribution server 120 to export the downloaded video image content to the removable medium unit 108 directly, was described. However, even in a case of a mere export in which the video image content existing in the video image receiving terminal 100 is written in the removable medium unit 108, the acquiring of the export license and the process of the writing-out for the medium are the same as those of the above-mentioned case.

Next, the procedure which is performed with respect to the progressive export during the content export in the video image receiving terminal 100 will be described with reference to FIG. 1, FIG. 5 and FIG. 6.

FIG. 5 shows an operation and a communication sequence, which are performed with respect to the video image receiving terminal 100 and the video image distribution server 120 at the time of the progressive export of the video image content.

The procedure for the processing of the content export instruction 300 to the content export 308 (the export license is acquired, the content key is generated and stored, and the downloaded video image content is encrypted and stored in the removable medium unit 108 sequentially) at the time of the direct export described above with reference to FIG. 2 is carried out similarly to the procedure of FIG. 5. Accordingly, in FIG. 5, the description with respect to the processing of the content export instruction 300 to the content encryption 307 is omitted, and the procedure for the processing of the content export 308 and the subsequent processing is described.

The explanation with respect to the processing of the content export instruction 300 to the content encryption 307 is omitted, because the processing is the same as that in the case of the direct export shown in FIG. 2 as described above. Then, the processing of the content export 308 and the subsequent processing in the procedure that is performed with respect to the progressive export will be explained below.

Figure 6:
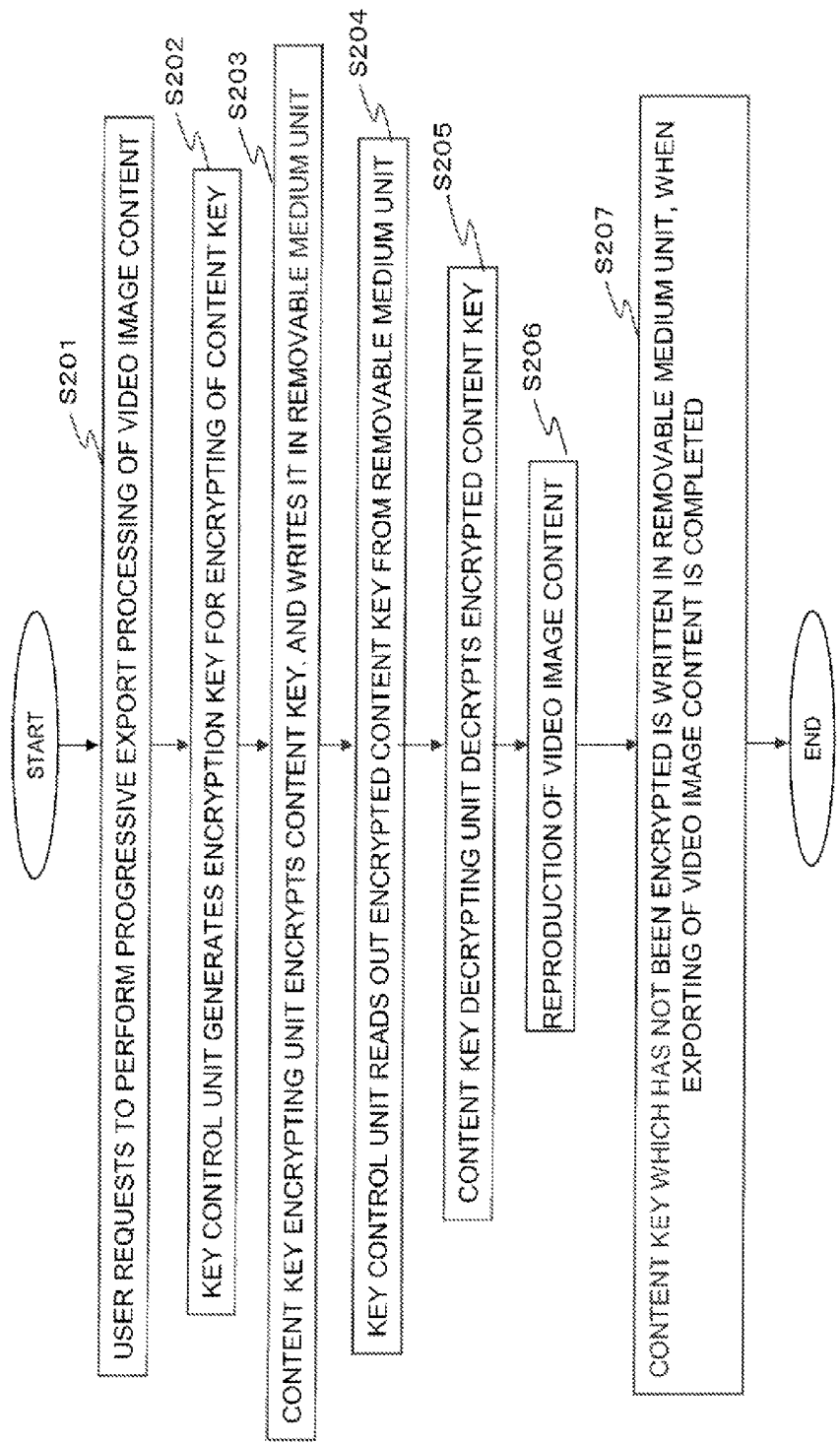
FIG. 6 is a flowchart showing a procedure which is performed with respect to the progressive export at the time of the progressive export of the video image content in the video image receiving terminal according to a first embodiment of the present invention.

FIG. 6 is a flowchart showing a procedure which is performed with respect to the progressive export at the time of the progressive export of the video image content in the video image receiving terminal 100.

While the video image receiving terminal 100 exports the content to the removable medium unit 108 (content export 308), the user uses a remote controller and the like in order to instruct the video image receiving terminal 100 to perform the content reproduction process with respect to the video image content which is being stored in the removable medium unit 108. The user operation receiving unit 107 receives the content reproduction request (content reproduction instruction 310) from the user (see step S201).

The user operation receiving unit 107, which has received the content reproduction request from the user, transmits the content reproduction request to the control unit 103. The control unit 103 informs the key control unit 104 that the progressive export is to be performed. The key control unit 104 generates an encryption key for encrypting of content key (generating of encryption key for content key 311), and stores the generated encryption key in the key storing unit 105 (see step S202).

Incidentally, as described above, the encryption key, which is generated by the key control unit 104 in this case and is used for encrypting of the content key, corresponds to one example of an encryption key for decryption key according to the present invention.

The key control unit 104 stores the encryption key in the key storing unit 105 as described above, extracts the content key corresponding to the video image content from the key storing unit 105 simultaneously, and stores the content key and the encryption key in the content key encrypting unit 112. The content key encrypting unit 112 encrypts the content key by using the encryption key (encrypting of content key 312). The encrypted content key is written in the removable medium unit 108 (encrypted content key write-in 313) (see step S203). The content key encrypting unit 112 writes the encrypted content key in the removable medium unit 108, however, does not write the encryption key in the removable medium unit 108. Here, the important thing is that only a terminal which performs the progressive export (in this case, only the video image receiving terminal 100) can decrypt correctly the encrypted content key written in the removable medium unit 108.

Next, the key control unit 104 reads out the encrypted content key from the removable medium unit 108 (encrypted content key read-out 314), and sets the encrypted content key to the content key decrypting unit 113 (see step S204).

The key control unit 104 simultaneously acquires the encryption key which was used for encrypting of the content key from the key storing unit 105, and sets the encryption key to the content key decrypting unit 113. The content key decrypting unit 113 decrypts the encrypted content key by using the encryption key (decrypting of content key 315). The content key decrypting unit 113 stores the decrypted content key to the content decrypting unit 114 (see step S205).

Incidentally, as described above, the encryption key, which is used by the content key decrypting unit 113 for decrypting of the encrypted content key, corresponds to one example of a decryption key for decryption key according to the present invention.

By the way, in the first embodiment, it has been described that i) the encryption key, which is used for encrypting of the content key and corresponds to one example of an encryption key for decryption key according to the present invention, and ii) the encryption key, which is used for decrypting of the encrypted content key and corresponds to one example of a decryption key for decryption key according to the present invention, are the same. However, the present invention is not limited to this configuration. For instance, as another example of a decryption key for decryption key according to the present invention, a decryption key which has a predetermined correspondence relation with an encryption key for decryption key according to the present invention can be used, and the decryption key is not the same as the encryption key for decryption key according to the present invention.

After the decryption of the content key is completed, the video image receiving terminal 100 reads out the video image content from the removable medium unit 108 (content read-out 316), and transmits the video image content, which has been read out, to the content decrypting unit 114. The content decrypting unit 114 decrypts the transmitted video image content by using the content key which has been decrypted by the content key decrypting unit 113. The content decrypting unit 114 transmits the decrypted video image content to the content decoding unit 115. The content decoding unit 115 decodes the decrypted data of the video image content. The decoded data of the video image content is displayed by the display unit 106 (content reproduction 317) (see step S206).

When the video image content has been completely exported to the removable medium unit 108, the key control unit 104 writes the content key in the removable medium unit 108 (content key write-in 309), and deletes the export license which is stored in the key storing unit 105 (see step S207). In this case, the content key which has not been encrypted with the encryption key that was generated by the key control unit 104 is written in the removable medium unit 108 by the key control unit 104. Accordingly, it is possible to reproduce the video image content in the removable medium unit 108 by using another reproduction terminal.

FIGS. 7(A) and 7(B) show the locations of the export license, the content key, and the video image content at the time of performing of the progressive export processing and after completion of the export processing, in the case where the progressive export processing is performed by the video image receiving terminal 100 according to the first embodiment.

As shown in FIG. 7(A), when the progressive export processing is performed, the video image content 151 which is in the middle of download is recorded in the removable medium 108 sequentially. In this case, the encrypted content key 153 is recorded in the removable medium unit 108 in order to reproduce the video image content 151, which has been recorded in the removable medium unit 108, by the video image receiving terminal 100.

The encrypted content key 153 can not be decrypted by another reproduction terminal. Therefore, in the case where the export processing of the video image content to the removable medium unit 108 is abnormally suspended, even if the removable medium unit 108 which is in the middle of export process is inserted into another reproduction terminal, the video image content 151 which is in the middle of recording process in the removable medium unit 108 can not be reproduced by such a reproduction terminal. Accordingly, since the video image content 151 which has been recorded in the removable medium unit 108 that is in the middle of progressive export process can not be reproduced by another reproduction terminal, it is unnecessary to delete the export license 150 acquired by the video image receiving terminal 100, during the progressive export processing, and the export license 150 is stored in the key storing unit 105.

Then, after the direct export processing has been completed, as shown in FIG. 4(B), the content key 152 is recorded in the removable medium unit 108 in order that other reproduction terminals can also reproduce the video image content 151 which has been recorded in the removable medium unit 108, and the export license 150 which has been stored in the key storing unit 105 of the video image receiving terminal 100 is deleted. In this case, the encrypted content key 153 can be overwritten by the content key 152, which has not been encrypted and is to be recorded in the removable medium unit 108, or the content key 152 can be recorded with the encrypted content key 153 maintained.

It has been described that the video image receiving terminal 100 stores the encryption key which is generated uniquely for encryption of the content key in the key storing unit 105 in the above described embodiment. However, the present invention is not limited to this configuration. For instance, the encryption key can be written in the removable medium unit 108. In this case, if the encryption key is stored as it is, another reproduction terminal can reproduce the encrypted video image content stored in the removable medium unit 108. Therefore, the encryption key can be coded again by using a unique rule of the video image receiving terminal 100.

The configuration in which the encryption key is coded again by using a unique rule of the video image receiving terminal 100 corresponds to one example of a decryption key for decryption key encrypting unit according to the present invention.

If the encryption key is written in the removable medium unit 108, it is feared that a lot of illegal copies might be made, because it is possible to copy the video image content and the encryption key which are written in the removable medium unit 108 to another removable medium. Therefore, it is possible to make the video image receiving terminal 100 store the identification information such as a medium ID, which identifies the removable medium unit 108, in the video image receiving terminal 100 when the video image receiving terminal 100 writes in the encryption key into the removable medium unit 108. Then, it is possible to prevent a lot of illegal copies from being made.

As described above, the content receiving terminal according to the present invention has a configuration in which a decryption key for content, which is written in a removable medium, is encrypted so as to be decrypted only by the content receiving terminal performing the export processing at the time of the progressive export. Thus, it is possible to prevent another reproduction terminal from reproducing the video image content. Therefore, since it is unnecessary to consume the export license acquired from the video image distribution server, it is possible to resume the export processing without newly acquiring an export license even if the progressive export processing of the video image content is abnormally suspended.

By the way, the configuration of the present invention may be realized in terms of software or may be realized in terms of hardware.

For example, the key control unit 104, the content key encrypting unit 112, content key decrypting unit 113, and the like can easily cope with the change of specifications with respect to the encryption key for decryption key and the decryption key for decryption key which are used by the present invention, and these encrypting system, by realizing them with software which makes a CPU (Central Processing Unit) execute the program, compared with a configuration realizing them with hardware.

Further, the received content decrypting unit 110, the content encrypting unit 111, content decrypting unit 114, and the like can cope with the change of encrypting system flexibly with respect to the video image content by realizing them with software which makes a CPU execute the program.

A non-transitory computer-readable medium according to the present invention is, for example, a recording medium having recorded thereon a program for causing a computer to execute the following operations of the content exporting and reproducing method according to the present invention described above:

i) the operation in the content export step which i-i) encrypts a decryption key for content, which is used for decrypting the encrypted content, by using an encryption key for decryption key, i-ii) records the encrypted decryption key for content in the portable recording medium, and exports the encrypted content sequentially to the portable recording medium; and ii) the operation in the content reproduction step which ii-i) reads out the encrypted decryption key for content from the portable recording medium, ii-ii) decrypts the encrypted decryption key for content by using a decryption key for decryption key, ii-iii) reads out the encrypted content that has been exported to the portable recording medium, and ii-iv) decrypts the encrypted content, which is read out from the portable recording medium, by using the decrypted decryption key for content to reproduce the content, while the encrypted content is exported to the portable recording medium sequentially.

Further, the non-transitory computer-readable medium according to the present invention is a recording medium which is readable by the computer and the read program executes the above described operation in cooperation with the computer.

The above described "operation in the content export step" or "operation in the content reproduction step" according to the present invention means the operation of the whole or part of the operation in the step described above.

A utility form of the program recorded in the non-transitory computer-readable medium according to the present invention may be a form in which the program is recorded in a recording medium such as a ROM readable by a computer and operates in cooperation with the computer.

A utility form of the program recorded in the non-transitory computer-readable medium according to the present invention may be a form in which the program is transmitted through a transmission medium such as the Internet, or a transmission medium such as light, a radio wave and a sound wave, is read by a computer, and operates in cooperation with the computer.

The computer described above is not limited to pure hardware such as a CPU and may include firmware, an OS, and peripheral equipment.

(Second Embodiment)

Another embodiment with respect to a video image receiving terminal which does not consume the export license even if progressive export processing of a video image content is abnormally suspended, will be described below.

Figure 8:
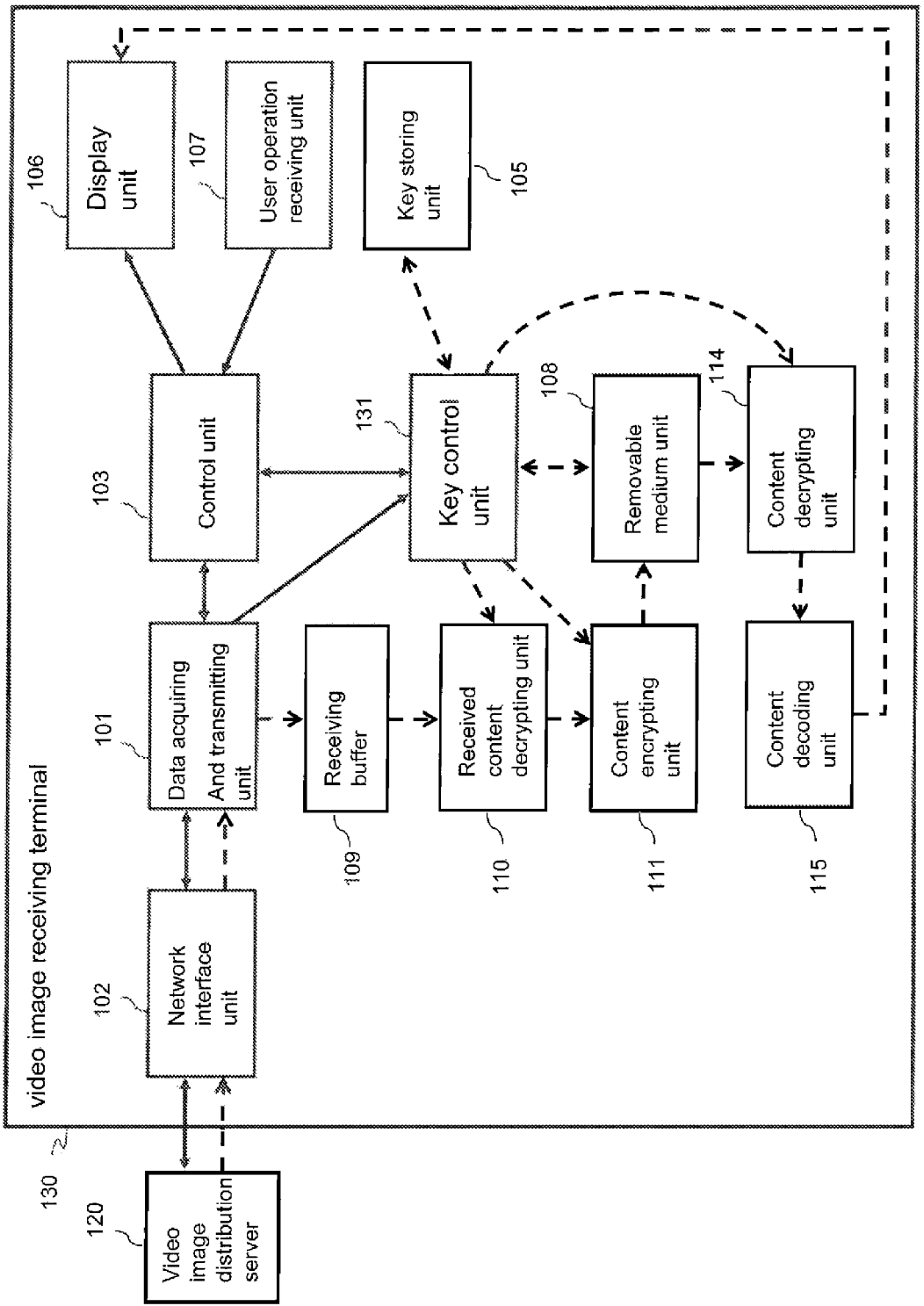
FIG. 8 is a block diagram showing a configuration of a video image receiving terminal according to a second embodiment of the invention which is related to the present invention.

FIG. 8 is a block diagram showing a configuration of a video image receiving terminal according to a second embodiment of the invention which is related to the present invention.

In FIG. 8, the components that are the same as those of the video image receiving terminal 100 according to the first embodiment shown in FIG. 1 are denoted by the same reference numerals. In this embodiment, the components which are different from those of FIG. 1 will be mainly described.

The video image receiving terminal 130 of the second embodiment is not provided with the content key encrypting unit 112 and the content key decrypting unit 113 as compared with the video image receiving terminal 100 of the first embodiment. Therefore, the processing of the key control unit 131 is different from the processing of the key control unit 104 described in the first embodiment, at the time of progressive export processing.

In the video image receiving terminal 130 of the second embodiment, the processing at the time of the direct export is the same as the processing of the video image receiving terminal 100 of the first embodiment. With regard to the processing at the time of progressive export during the content export, the processing of the video image receiving terminal 130 is different from the processing of the video image receiving terminal 100.

The processing at the time of direct export in the video image receiving terminal 130 of the second embodiment is the same as that of the video image receiving terminal 100 of the first embodiment described by using FIGS. 1 to 4. The procedures which are performed at the time of progressive export of the video image content in the video image receiving terminal 130 of the second embodiment will be described below with reference to FIGS. 8 to 10.

Figure 9:
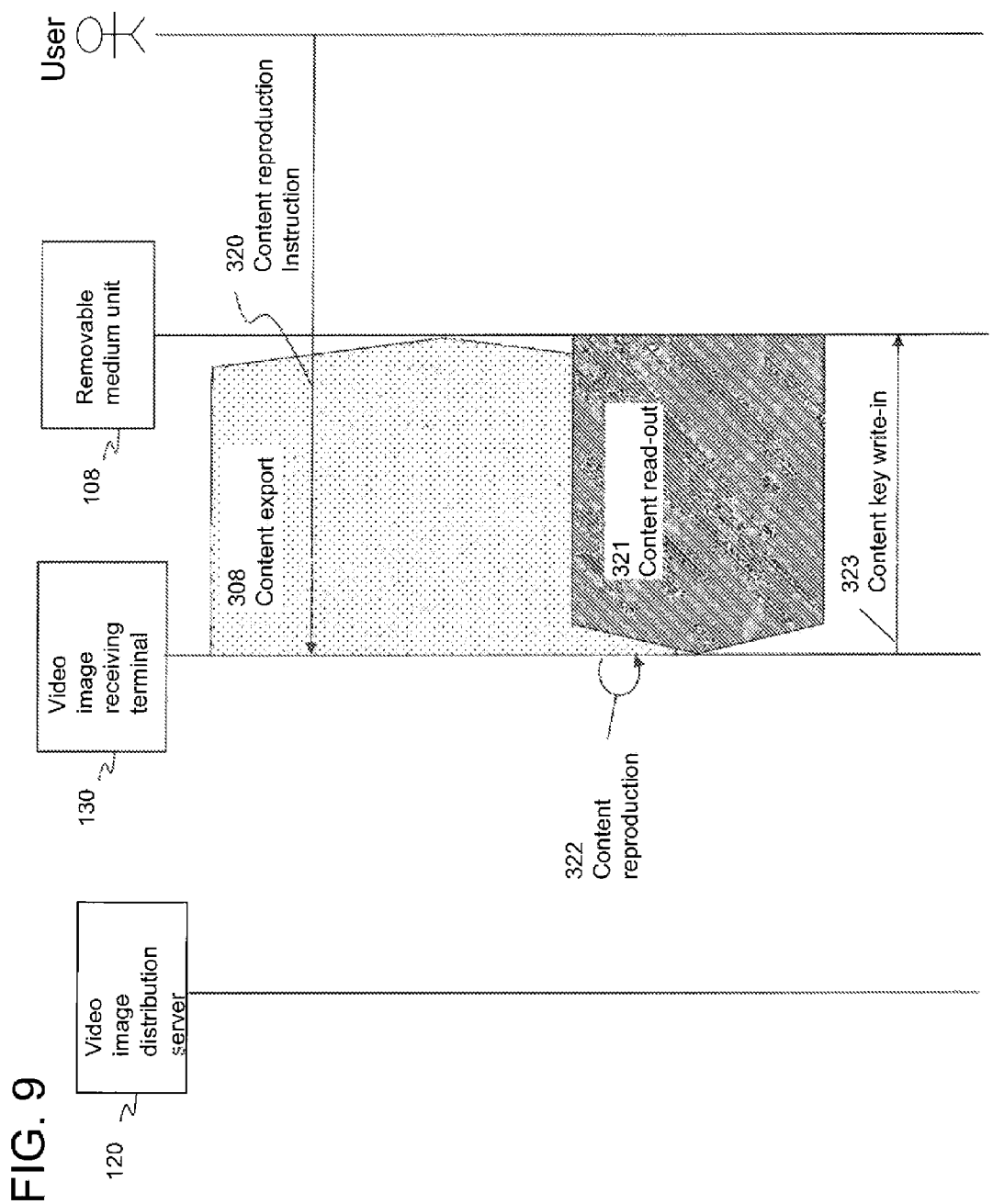
FIG. 9 is a diagram showing an operation and a communication sequence, which are performed with respect to the video image receiving terminal and the video image distribution server at the time of the progressive export of the video image content, according to a second embodiment of the invention which is related to the present invention.

FIG. 9 shows an operation and a communication sequence, which are performed with respect to the video image receiving terminal 130 and the video image distribution server 120 at the time of the progressive export of the video image content.

The procedure for the processing of the content export instruction 300 to the content export 308 (the export license is acquired, the content key is generated and stored, and the downloaded video image content is encrypted and stored in the removable medium unit 108 sequentially) at the time of the direct export of the first embodiment described above with reference to FIG. 2 is carried out similarly to the procedure of the video image receiving terminal 130 of the second embodiment. Accordingly, in FIG. 9, the description with respect to the processing of the content export instruction 300 to the content encryption 307 is omitted, and the procedure for the processing in the content export 308 and the subsequent processing is described.

The explanation with respect to the processing of the content export instruction 300 to the content encryption 307 is omitted, because the processing is the same as that in the case of the direct export shown in FIG. 2 as described above. Then, the processing of the content export 308 and the subsequent processing in the procedure that is performed with respect to the progressive export will be explained below.

Figure 10:
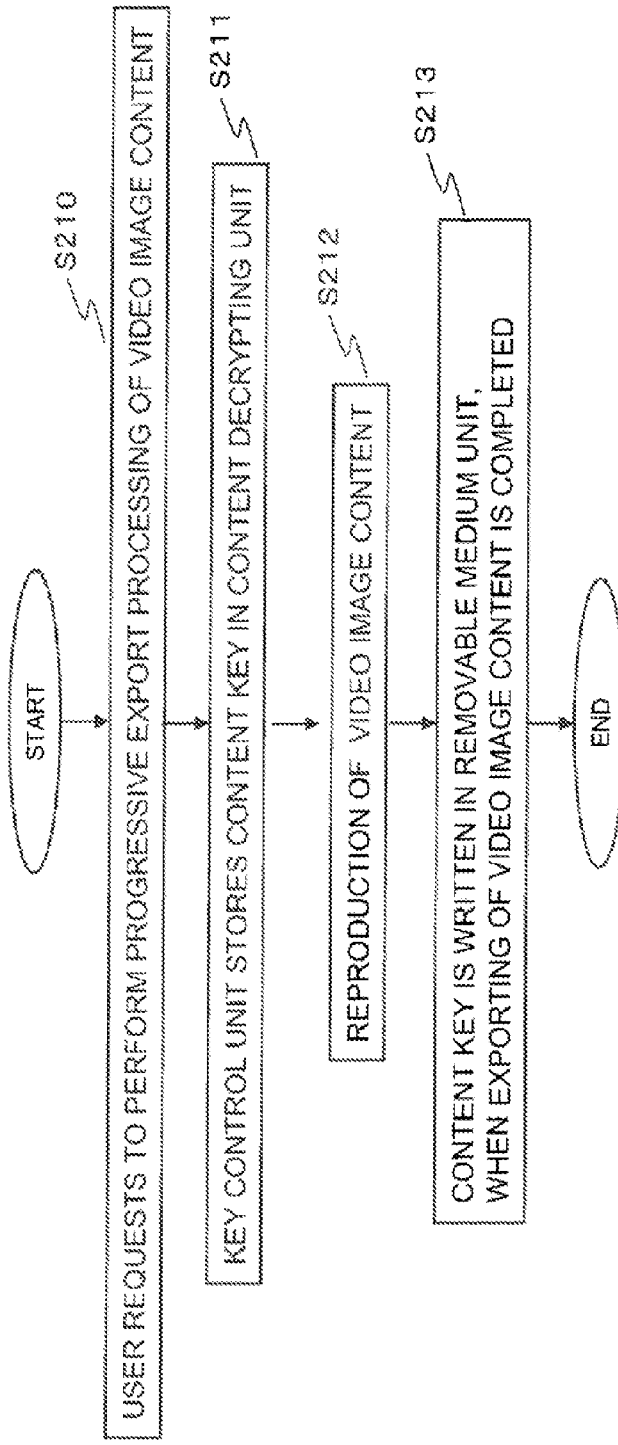
FIG. 10 is a flowchart showing a procedure which is performed with respect to the progressive export at the time of the progressive export of the video image content in the video image receiving terminal according to a second embodiment of the invention which is related to the present invention.
Figure 12A:
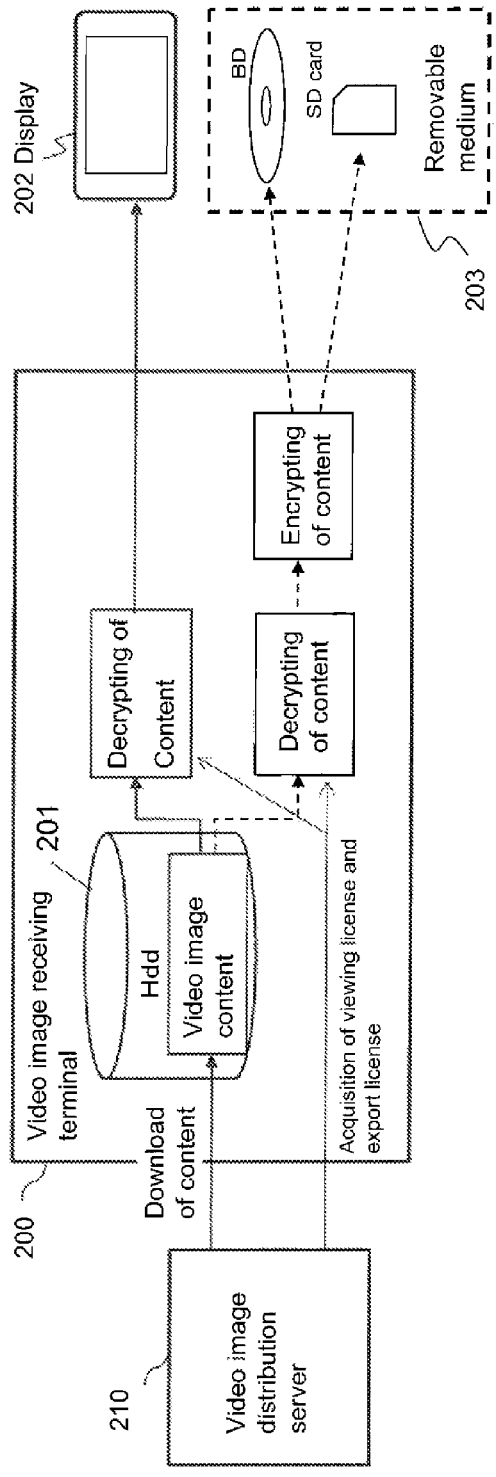
FIG. 12(A) is a diagram for describing processing details of the video image content, in a conventional video image download service.
Figure 12B:
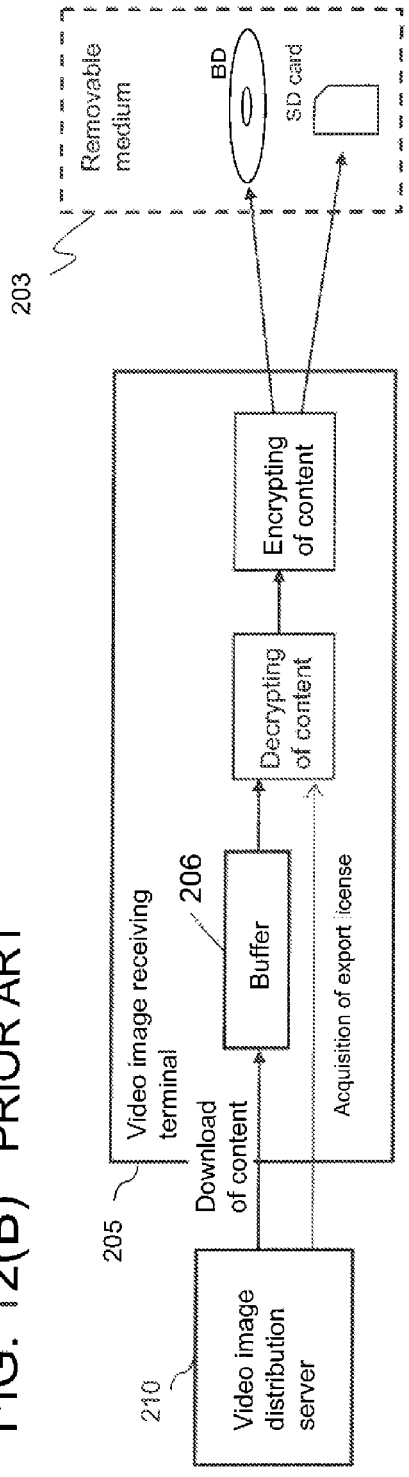
FIG. 12(B) is a diagram for describing processing details of the video image content, in a conventional direct export service.
Figure 13A:
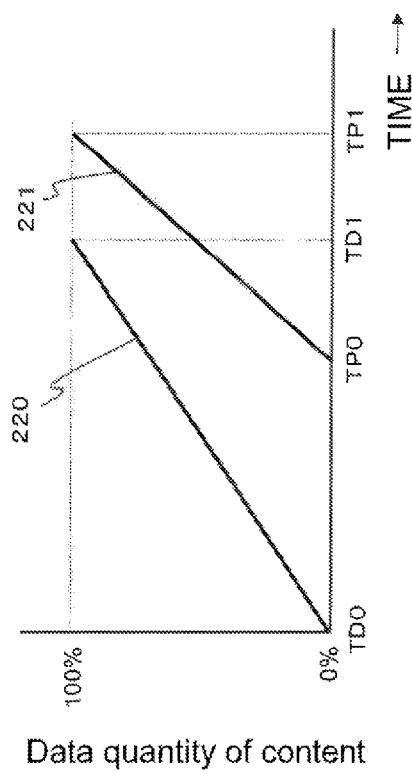
FIG. 13(A) is a diagram showing a time-dependent relation between the downloading and the reproduction operation, during the progressive downloading.
Figure 13B:
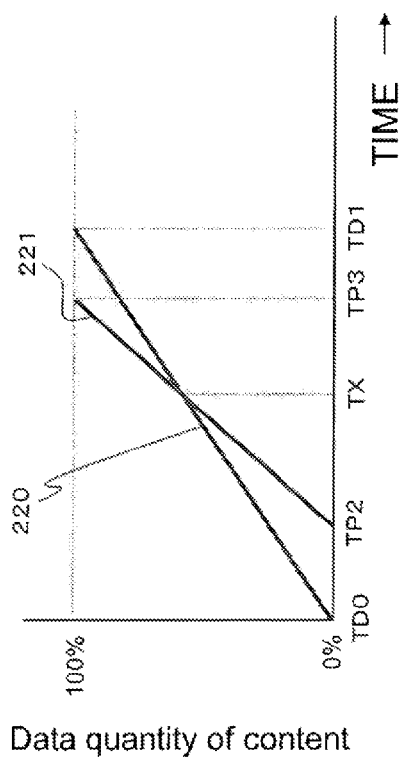
FIG. 13(B) is a diagram showing a time-dependent relation between the downloading and the reproduction operation, during the progressive downloading.
Figure 14A:
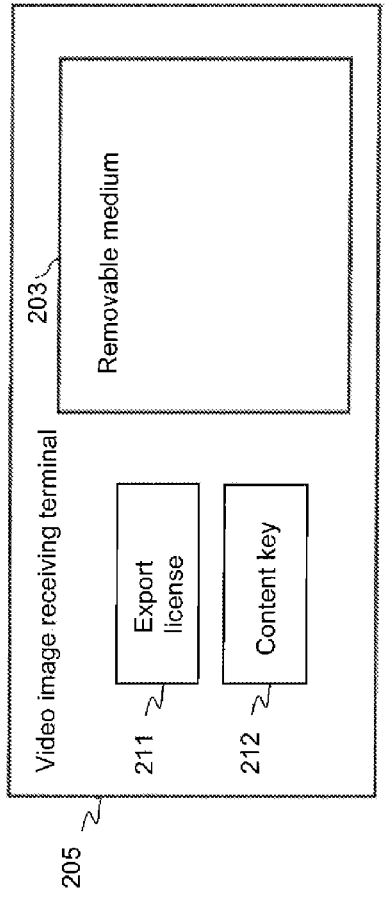
FIG. 14(A) is a diagram showing the locations of the export license, the content key, and the video image content before starting of the export processing, concerning the progressive export processing performed by applying a conventional progressive download technology.
Figure 14B:
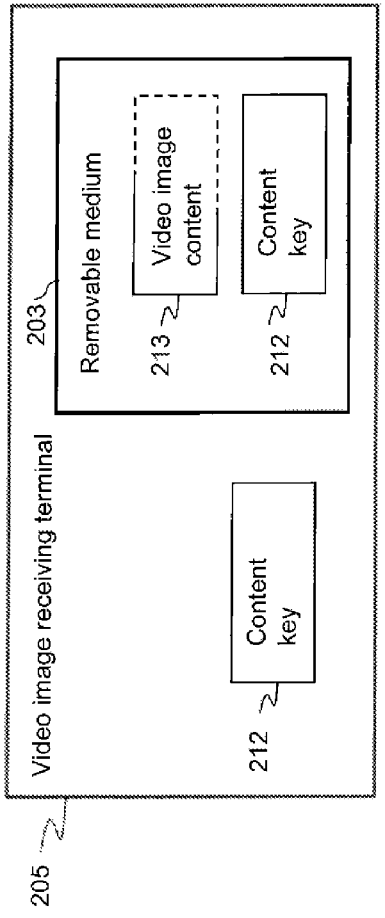
FIG. 14(B) is a diagram showing the locations of the export license, the content key, and the video image content at the time of performing of the progressive export processing, concerning the progressive export processing performed by applying a conventional progressive download technology.

FIG. 10 is a flowchart showing a procedure which is performed with respect to the progressive export at the time of the progressive export of the video image content in the video image receiving terminal 130.

While the video image receiving terminal 130 exports the content to the removable medium unit 108 (content export 308), the user uses a remote controller and the like in order to instruct the video image receiving terminal 100 to perform the content reproduction process with respect to the video image content which is being stored in the removable medium unit 108. The user operation receiving unit 107 receives the content reproduction request (content reproduction instruction 320) from the user (see step S210).

The user operation receiving unit 107, which has received the content reproduction request from the user, transmits the content reproduction request to the control unit 103. The control unit 103 informs the key control unit 131 that the progressive export is to be performed.

The key control unit 131 extracts the content key, which corresponds to the video image content and is stored in the key storing unit 105, from the key storing unit 105 and stores the extracted content key in the content decrypting unit 114 (see step S211).

The video image receiving terminal 130 reads out the video image content, which has been exported to the removable medium unit 108, from the removable medium unit 108 (content read-out 312), and transmits the video image content, which has been read out, to the content decrypting unit 114. The content decrypting unit 114 decrypts the video image content by using the content key which has been stored by the key control unit 131. The content decrypting unit 114 transmits the decrypted video image content to the content decoding unit 115. The content decoding unit 115 decodes the decrypted data of the video image content. The decoded data of the video image content is displayed by the display unit 106 (content reproduction 322) (see step S212).

When the video image content has been completely exported to the removable medium unit 108, the key control unit 131 writes the content key in the removable medium unit 108 (content key write-in 323), and deletes the export license which is stored in the key storing unit 105 (see step S213). Since the content key is written in the removable medium unit 108 by the key control unit 104, it is possible to reproduce the video image content in the removable medium unit 108 by using another reproduction terminal.

FIGS. 11(A) and 11(B) show the locations of the export license, the content key, and the video image content at the time of performing of the progressive export processing and after completion of the export processing, in the case where the progressive export processing is performed by the video image receiving terminal 130 according to the second embodiment.

As shown in FIG. 11(A), when the progressive export processing is performed, the video image content 151 which is in the middle of download is recorded in the removable medium 108 sequentially. In this case, the content key 152 which is used for reproducing the video image content 151 is not recorded in the removable medium unit 108.

In this case, the content key 152 has not been recorded in the removable medium unit 108. Therefore, in the case where the export processing of the video image content to the removable medium unit 108 is abnormally suspended, even if the removable medium unit 108 which is in the middle of export process is inserted into another reproduction terminal, the video image content 151 which is in the middle of recording process in the removable medium unit 108 can not be reproduced by such a reproduction terminal. Accordingly, since the video image content 151 which has been recorded in the removable medium unit 108 that is in the middle of progressive export process can not be reproduced by another reproduction terminal, it is unnecessary to delete the export license 150 acquired by the video image receiving terminal 100, during the progressive export processing, and the export license 150 is stored in the key storing unit 105.

Then, after the direct export processing has been completed, as shown in FIG. 11(B), the content key 152 is recorded in the removable medium unit 108 so that other reproduction terminals can also reproduce the video image content 151 which has been recorded in the removable medium unit 108, and the export license 150 which has been stored in the key storing unit 105 of the video image receiving terminal 130 is deleted.

As described above, in the video image receiving terminal 130 according to the second embodiment, at the time of the progressive export, the content key 152 for reproducing the video image content 151 is not written in the removable medium unit 108, and the video image content 151 which is being stored in the removable medium unit 108 is reproduced by using the content key 152 which is stored in the video image receiving terminal 130. Thus, it is possible to prevent another reproduction terminal from reproducing the video image content. Therefore, since it is unnecessary to consume the export license 150 acquired from the video image distribution server 120, it is possible to resume the export processing without newly acquiring an export license even if the progressive export processing of the video image content is abnormally suspended.

By the way, in the above described embodiments, it has been described that i) the above described key for encrypting content, which is used by the content encrypting unit 111 and corresponds to one example of an encryption key for content according to the present invention, and ii) the above described key for decrypting content, which is used to decrypt the encrypted video image content stored in the removable medium unit 108 and corresponds to one example of a decryption key for content according to the present invention, are the same. However, the present invention is not limited to this configuration. For instance, as another example of a decryption key for content according to the present invention, a decryption key which has a predetermined correspondence relation with an encryption key for content according to the present invention can be used, and the decryption key for content is not the same as the encryption key for content according to the present invention.

INDUSTRIAL APPLICABILITY

The content receiving terminal, the content exporting and reproducing method, and the like according to the present invention have an effect of allowing export processing of a video image content to be continued without consumption of the export license even if the progressive export processing is abnormally suspended, and are useful as a content receiving terminal, a exporting and reproducing method or the like having functions of exporting a video image content to a removable medium.

REFERENCE SIGNS LIST 100 video image receiving terminal
101 data acquiring and transmitting unit
102 network interface unit
103 control unit
104 key control unit
105 key storing unit display unit
107 user operation receiving unit
108 removable medium unit
109 receiving buffer
110 received content decrypting unit
111 content encrypting unit
112 content key encrypting unit
113 content key decrypting unit
114 content decrypting unit
115 content decoding unit
120 video image distribution server
130 video image receiving terminal
131 key control unit
200 video image receiving terminal
201 HDD
202 display
203 removable medium
205 video image receiving terminal
206 buffer
300 content export instruction
301 export license request
302 confirmation process for issue of license
303 export license response
304 content download request
305 content download response
306 content key generation
307 content encryption
308 content export
309 content key write-in
310 content reproduction instruction
311 generating of encryption key for content key
312 encrypting of content key
313 encrypted content key write-in
314 encrypted content key write-out
315 decrypting of content key
316 content read-out
317 content reproduction
320 content reproduction instruction
312 content read-out
322 content reproduction
323 content key write-in

What is claimed is:

1. A content receiving terminal that allows a portable recording medium to be set, the content receiving terminal comprising:
a network interface that receives a content from a content server through a communication network, based on an acquired export license;
a non-transitory storage; and
a processor that:
encrypts the content that is received by the network interface by using an encryption key for the content;
exports the encrypted content directly and sequentially to the portable recording medium;
encrypts a decryption key for the content, which is used for decrypting the encrypted content, by using an encryption key for the decryption key for the content, the encryption key for the decryption key for the content being generated uniquely;
records the encrypted decryption key for the content in the portable recording medium;
sequentially reads out the encrypted content that has been exported to the portable recording medium;
reads out the encrypted decryption key for the content from the portable recording medium;

(i) uniquely generates a decryption key for decrypting the encrypted decryption key for the content, the encrypted decryption key being able to be decrypting only by the content receiving terminal, and (ii) stores the decryption key for decrypting the encrypted decryption key for the content in the non-transitory storage during the process of exporting the encrypted content directly and sequentially to the portable recording medium;

decrypts the read-out encrypted decryption key for the content by using the decryption key for decrypting the encrypted decryption key for the content; and decrypts the encrypted content that is read out from the portable recording medium, by using the decrypted decryption key for the content to reproduce the content, wherein the processor encrypts the decryption key for decrypting the encrypted decryption key for the content by using another encryption key, wherein the processor uniquely generates the other encryption key for encrypting the decryption key for decrypting the encrypted decryption key for the content, and wherein when the decryption key for decrypting the encrypted decryption key for the content is encrypted, the processor records the encrypted decryption key for decrypting the encrypted decryption key for the content in the portable recording medium.

2. The content receiving terminal according to claim 1, wherein the processor records the decryption key for the content, that is not encrypted, in the portable recording medium and destroys the export license, when the exporting of the encrypted content to the portable recording medium is completed.

3. The content receiving terminal according to claim 1, wherein the decryption the key for decrypting the encrypted decryption key for the content is only stored in the non-transitory storage.

4. The content receiving terminal according to claim 1, wherein the processor stores a medium ID, which identifies the portable recordable medium, in the non-transitory storage, when the decryption key for decrypting the encrypted decryption key for the content is written to the portable recording medium.

5. A content exporting and reproducing method in a content receiving terminal configured to (i) encrypt a content that is received from a content server through a communication network, based on an acquired export license, by using an encryption key for the content, and (ii) export the encrypted content directly to a portable recording medium, the content exporting and reproducing method comprising:

a content export step of (i) encrypting a decryption key for the content, that is used for decrypting the encrypted content, by using an encryption key for the decryption key for the content, (ii) recording the encrypted decryption key for the content in the portable recording medium, and (iii) exporting the encrypted content directly and sequentially to the portable recording medium; and a content reproduction step of (i) reading out the encrypted decryption key for the content from the portable recording medium, (ii) decrypting the encrypted decryption key for the content by using a decryption key for decrypting the encrypted decryption key for the content, (iii) reading out the encrypted content that has been exported to the portable recording medium, and (iv) decrypting the read-out encrypted content that is read out from the portable recording medium, by using the decrypted decryption key for the content to reproduce the content, wherein the content receiving terminal is further configured to (i) uniquely generate the decryption key for decrypting the encrypted decryption key for the content, the encrypted decryption key being able to be decrypted only by the content receiving terminal, and (ii) store the decryption key for decrypting the encrypted decryption key for the content in the content receiving terminal during the process of exporting the encrypted content directly and sequentially to the portable recording medium, wherein the content exporting and reproducing method further comprises steps of:

encrypting the decryption key for decrypting the encrypted decryption key for the content by using another encryption key; and when the decryption key for decrypting the encrypted decryption key for the content is encrypted, recording the encrypted decryption key for decrypting the encrypted decryption key for the content in the portable recording medium, and wherein the content receiving terminal uniquely generates the other encryption key for encrypting the decryption key for decrypting the encrypted decryption key for the content.

6. The content exporting and reproducing method according to claim 5, further comprising a decryption key recording step of recording the decryption key for the content, which is not encrypted, in the portable recording medium, and destroying the export license, when the exporting of the encrypted content to the portable recording medium is completed.

7. A non-transitory computer-readable medium having a program stored thereon, wherein the program causes a computer to execute the content exporting and reproducing method according to claim 5.

8. The content exporting and reproducing method according to claim 5, wherein the decryption key for decrypting the encrypted decryption key for the content is only stored in the content receiving terminal.

9. The content exporting and reproducing method according to claim 5, further comprising a medium ID storing step of storing a medium ID, which identifies the portable recordable medium, in the content receiving terminal, when the decryption key for decrypting the encrypted decryption key for the content is written to the portable recording medium.

* * * * *